(12) United States Patent
Tomiuga

(10) Patent No.: US 10,458,507 B2
(45) Date of Patent: Oct. 29, 2019

(54) FRONT FORK

(71) Applicant: KYB MOTORCYCLE SUSPENSION Co., Ltd., Kani-shi, Gifu (JP)

(72) Inventor: Takeshi Tomiuga, Gifu (JP)

(73) Assignee: KYB MOTORCYCLE SUSPENSION CO., LTD., Kani-Shi, Gifu (JP)

( * ) Notice: Subject to any disclaimer, the term of this patent is extended or adjusted under 35 U.S.C. 154(b) by 99 days.

(21) Appl. No.: 15/562,885

(22) PCT Filed: Mar. 23, 2016

(86) PCT No.: PCT/JP2016/059230
§ 371 (c)(1),
(2) Date: Sep. 28, 2017

(87) PCT Pub. No.: WO2016/158617
PCT Pub. Date: Oct. 6, 2016

(65) Prior Publication Data
US 2018/0112735 A1 Apr. 26, 2018

(30) Foreign Application Priority Data
Apr. 2, 2015 (JP) ................. 2015-075531

(51) Int. Cl.
*B62K 25/08* (2006.01)
*F16F 9/43* (2006.01)
*F16F 9/36* (2006.01)
*F16F 13/00* (2006.01)

(52) U.S. Cl.
CPC .............. *F16F 9/432* (2013.01); *B62K 25/08* (2013.01); *F16F 9/36* (2013.01); *F16F 9/362* (2013.01); *F16F 13/007* (2013.01); *F16F 2230/06* (2013.01)

(58) Field of Classification Search
CPC .. F16F 9/32; F16F 9/432; F16F 13/007; F16F 9/44; B62K 25/04; B62K 25/08; B60G 13/08
USPC ...... 188/297, 312, 313, 316, 322.16–322.18; 280/275, 276
See application file for complete search history.

(56) References Cited

U.S. PATENT DOCUMENTS

| 4,360,192 | A | 11/1982 | Ishida | |
|---|---|---|---|---|
| 8,251,355 | B2 * | 8/2012 | Tomiuga | B62K 25/08 188/312 |
| 8,585,069 | B2 * | 11/2013 | Wimmer | B62K 25/08 188/275 |
| 9,604,694 | B2 * | 3/2017 | Tomiuga | F16F 9/43 |
| 2015/0184715 | A1 * | 7/2015 | Tomiuga | B62K 25/04 188/297 |

(Continued)

FOREIGN PATENT DOCUMENTS

| JP | S56-072945 U | 6/1981 |
|---|---|---|
| JP | 2010-185571 A | 8/2010 |

(Continued)

*Primary Examiner* — Christopher P Schwartz
(74) *Attorney, Agent, or Firm* — Rabin & Berdo, P.C.

(57) ABSTRACT

A front fork includes a fork main body, a damper cartridge, and a closing member. The damper cartridge includes a cylinder, a piston mounted on a piston rod, and a rod guide which guides the piston rod and to which a fluid filling port that allows the outside of the cylinder to communicate with the fluid chamber is provided. The closing member is provided on the rod guide and closes the fluid filling port.

5 Claims, 2 Drawing Sheets

(56) References Cited

U.S. PATENT DOCUMENTS

| | | | |
|---|---|---|---|
| 2016/0046349 A1* | 2/2016 | Tomiuga | F16F 9/43 |
| | | | 188/316 |
| 2018/0105225 A1* | 4/2018 | Tomiuga | B62K 25/08 |

FOREIGN PATENT DOCUMENTS

| | | | |
|---|---|---|---|
| JP | 2012-167785 A | 9/2012 |
| JP | 2014-190492 A | 10/2014 |
| WO | WO 2014-038586 A1 | 3/2014 |

\* cited by examiner

FRONT FORK

TECHNICAL FIELD

The present invention relates to a front fork, and more particularly relates to improving a front fork that is attached to a front wheel side of a saddle-type vehicle and absorbs vibrations during travel.

BACKGROUND ART

Among front forks that are interposed between a front wheel and a vehicle body of a saddle-type vehicle, there is a front fork that exerts a damping force to suppress vibrations of the vehicle body. Such a front fork includes the following: a fork main body having an annular outer tube and an annular inner tube that is inserted into the outer tube such that the inner tube can move freely in the axial direction; and a damper cartridge that is accommodated in the fork main body, and extends/contracts together with the extension/contraction of the fork main body so as to exert a damping force. The damper cartridge includes the following: a cylinder in which a fluid chamber that is filled with a working fluid is formed; an annular rod guide that is mounted on the cylinder end and closes one side of the fluid chamber; a piston rod that penetrates the rod guide and moves into/out of the cylinder; a piston that is retained by the piston rod and partitions the fluid chamber into an extension-side chamber and a contraction-side chamber; a piston passage that is formed in the piston and allows the extension-side chamber to communicate with the contraction-side chamber; and a damping valve that applies resistance to the hydraulic fluid passing through the piston passage. During extension/contraction in which the piston rod moves into/out of the cylinder, the front fork generates a damping force caused by resistance of the damping valve when hydraulic fluid of one chamber that is pressurized by the piston passes through the piston passage and moves into the other chamber (for example, refer to JP2012-167785A).

Further, JP2010-185571A discloses a fluid chamber pressurization-type front fork that includes the following: a free piston that slidingly contacts the inner peripheral surface of the cylinder and closes the side of the fluid chamber that is opposite the rod guide; and a biasing means that biases the free piston toward the fluid chamber side.

SUMMARY OF INVENTION

When assembling such a front fork, if the damper cartridge is assembled in the fork main body after the hydraulic fluid is sealed in the fluid chamber, this leads to an increase in the number of parts and the number of assembly steps. Therefore, it is preferable to fill the hydraulic fluid into the fluid chamber after assembling the damping cartridge in the fork main body. However, in an upright front fork in which the cylinder is connected to the vehicle wheel side like that disclosed in JP2012-167785A, a vehicle body-side opening of the cylinder is closed by the rod guide, and thus it is difficult to fill the hydraulic fluid into the cylinder from the vehicle body side.

Further, in a front fork like that disclosed in JP2010-185571A, the side opposite the rod is closed by the free piston, and a seal member that slidingly contacts the outer peripheral surface of the piston rod is provided on the inner periphery of the rod guide. Therefore, if such a front fork is configured in an upright configuration, the inside of the cylinder is sealed tightly and it becomes even more difficult to fill the hydraulic fluid from the vehicle body side, and it also becomes difficult to fill the hydraulic fluid from the vehicle wheel side.

Thus, an object of the present invention is to provide a front fork in which hydraulic fluid can be easily filled into the cylinder after the cylinder has been attached to the fork main body even when the front fork is set to an upright configuration.

According to a certain aspect of the present invention, a front fork includes: a fork main body having an annular outer tube and an annular inner tube that is inserted into the outer tube such that the inner tube can move freely in the axial direction; a damper cartridge having: a cylinder which is provided in the fork main body and in which a fluid chamber filled with hydraulic fluid is formed; a piston rod that freely moves in the axial direction through the inside of the cylinder; a piston that is mounted on the piston rod and partitions the inside of the cylinder into an extension-side chamber and a contraction-side chamber; and a rod guide which is mounted on an end of the cylinder and guides the piston rod, and to which a fluid filling port that allows the outside of the cylinder to communicate with the fluid chamber is provided; and a closing member that is provided on the rod guide and closes the fluid filling port.

DESCRIPTION OF EMBODIMENTS

Figure 1:
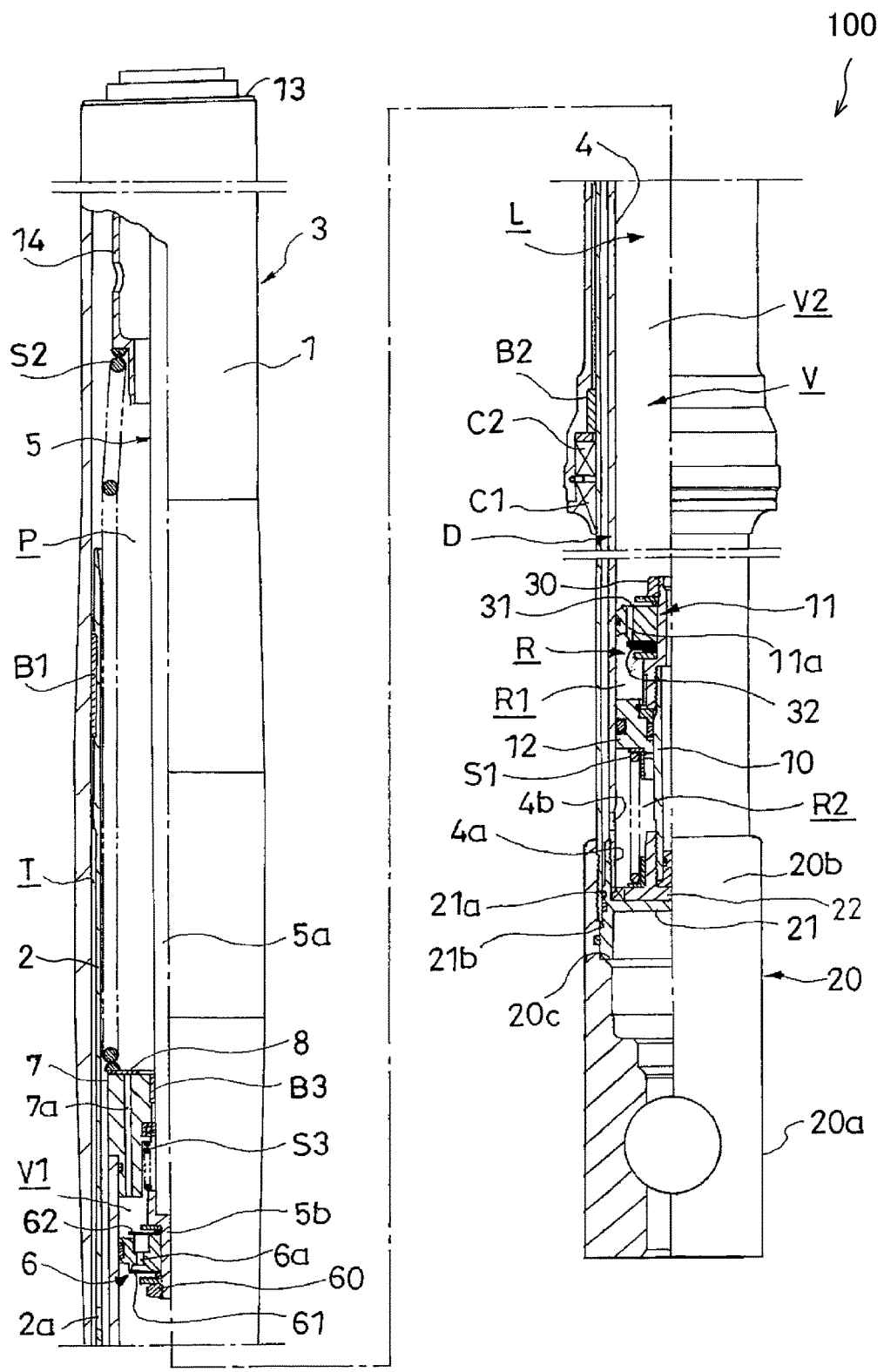
FIG. 1 is a front view illustrating a front fork according to an embodiment of the present invention with a portion of the front fork cut away.

Embodiments of the present invention will now be explained below while referring to the attached drawings. When the same reference numeral is used across several of the drawings, this reference numeral indicates the same or corresponding part.

As shown in FIG. 1, a front fork 100 according to the present embodiment includes the following: a fork main body 3 having an annular outer tube 1 and an annular inner tube 2 that is inserted into the outer tube 1 such that the inner tube 2 can move freely in the axial direction; a damper cartridge D provided in the fork main body 3; and a closing member 8 that closes a fluid filling port 7a provided to a rod guide 7 of the damper cartridge D.

The front fork 100 is mainly attached to the front wheel side of a saddle-type vehicle to retain the front wheel. Although not illustrated, a method for attaching the front fork 100 to the front wheel side of a saddle-type vehicle is as follows. Two front forks 100 are disposed on the left and right sides of the front wheel, and then the top-end side parts of the front forks 100 are connected using vehicle body-side brackets and mounted to the vehicle body. Next, a vehicle wheel-side bracket 20 provided at the bottom end of the inner tube 2 of each front fork 100 is connected to the axle of the front wheel, and thereby the front forks 100 are attached to the front wheel side of the saddle-type vehicle.

Each part of the front fork 100 will now be explained in detail below. As shown in FIG. 1, the fork main body 3 is formed in an extendible/contractible telescopic shape, and includes the outer tube 1 and the inner tube 2 which moves into/out of the outer tube 1. The damper cartridge D is accommodated within the fork main body 3, and a main spring S2 that biases the fork main body 3 in the extension direction is interposed between the fork main body 3 and the damper cartridge D.

A fluid reservoir P is also formed between the fork main body 3 and the damper cartridge D. Hydraulic fluid is stored in the fluid reservoir P, and a gas is accommodated on the top side of the fluid reservoir P via the liquid surface of the hydraulic fluid.

A communication hole 2a is formed in the inner tube 2, and thereby the hydraulic fluid can move freely between the fluid reservoir P and a cylindrical gap T formed between the outer tube 1 and the inner tube 2.

A top-side opening of the fork main body 3 is closed by a cap member 13 that is screwed into the inner periphery at the top end of the outer tube 1. A bottom-side opening of the fork main body 3 is closed by the vehicle wheel-side bracket 20 that is screwed onto the outer periphery at the bottom end of the inner tube 2. Further, an annular dust seal C1 and an oil seal C2, which slidingly contact the outer peripheral surface of the inner tube 2 are mounted to the inner periphery at the bottom end of the outer tube 1. Thereby, the inside of the fork main body 3 is maintained in a tightly sealed state. In the present embodiment, the front fork 100 is of the inverted type in which the outer tube 1 is connected to the vehicle body side and the inner tube 2 is connected to the vehicle wheel side, and a cylinder 4 to be explained below is set to an upright configuration in which a piston rod 5 protrudes upwards. The front fork 100 may be of the upright type in which the outer tube 1 is connected to the vehicle wheel side and the inner tube 2 is connected to the vehicle body side, and the cylinder 4 to be explained below may be set to an inverted configuration in which the piston rod 5 protrudes downwards.

The main spring S2, which is interposed between the fork main body 3 and the damper cartridge D, biases the fork main body 3 in the extension direction to elastically support the vehicle body. In the present embodiment, in the main spring S2, the annular closing member 8 that is provided on the rod guide 7 serves as a spring seat, and the bottom end of the main spring S2 is supported by the closing member 8 and the top end is supported by an annular spring receiver 14.

Bushes B1 and B2, which guide the axial direction movement of the outer tube 1 and the inner tube 2, are provided between the outer tube 1 and the inner tube 2. Hydraulic fluid is accommodated in the cylindrical gap T, and hydraulic fluid is supplied to the cylindrical gap T from the communication hole 2a formed in the inner tube 2. Thereby, the sliding surfaces of both bushes B1 and B2 can be lubricated with hydraulic fluid.

Figure 2:
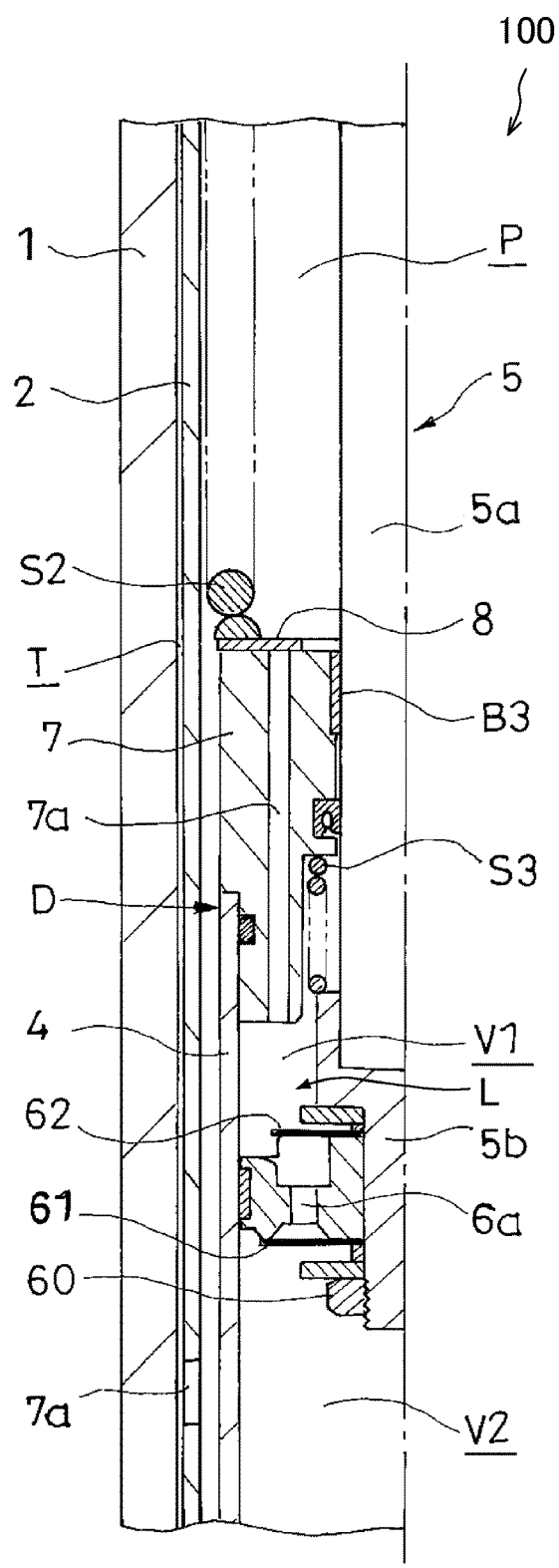
FIG. 2 is an enlarged view of the main parts of FIG. 1.

As shown in FIGS. 1 and 2, the damper cartridge D includes the following: the cylinder 4 in which a fluid chamber L is formed; the annular rod guide 7 that is mounted on the top end of the cylinder 4; the piston rod 5 that penetrates the rod guide 7 and freely moves in the axial direction through the inside of the cylinder 4; a piston 6 that is mounted on the end of the piston rod 5 and moves in the axial direction through the inside of the cylinder 4 while slidingly contacting the inner peripheral surface of the cylinder 4; a base rod 10 that stands up from an axial center part on the side of the cylinder 4 opposite the piston rod; a base member 11 that is retained on the distal end of the base rod 10 and partitions the fluid chamber L into an operation chamber V and a reservoir R; a free piston 12 that is formed in an annular shape, and that is mounted on the outer periphery of the base rod 10 such that the free piston 12 can move freely in the axial direction and slidingly contacts the inner peripheral surface of the cylinder 4; a bottomed cylindrical bottom member 21 that closes the bottom end of the cylinder 4; and a biasing spring S1 that is interposed between the free piston 12 and the bottom member 21 and biases the free piston 12 toward the top side in FIG. 1.

The rod guide 7 is annular, and guides the axial direction movement of the piston rod 5 which is inserted into the inner periphery of the rod guide 7. The bottom in FIG. 1 of the piston rod 5 is supported by a bush B3 provided in the inner periphery of the rod guide 7 so that the piston rod 5 can move freely in the axial direction. Further, as shown in FIG. 2, the fluid filling port 7a, which allows the fluid chamber L within the cylinder 4 to communicate with the outside of the damper cartridge D (the outside of the cylinder), is provided to the rod guide 7. Therefore, even after the damper cartridge D has been accommodated in the fork main body 3, hydraulic fluid can be filled from outside of the damper cartridge D into the fluid chamber L via the fluid filling port 7a.

The fluid filling port 7a opens from the top end of the rod guide 7 and passes to the bottom end along the axial direction of the cylinder 4 so as to allow the fluid chamber L to communicate with the outside of the damper cartridge D as mentioned above. The fluid filling port 7a may be inclined relative to the axis line or may be bent partway through, but in this case it becomes difficult to perform the hole-opening machining for the fluid filling port 7a in the rod guide 7. Thus, the fluid filling port 7a is preferably opened along the axial direction.

Since the fluid filling port 7a does not bend partway through, the hydraulic fluid can be filled without any gas from within the fluid chamber L, which escapes in place of the hydraulic fluid when filling the hydraulic fluid, remaining within the fluid filling port 7a. After filling the hydraulic fluid, the fluid filling port 7a is closed by the annular closing member 8 that is provided on the rod guide 7, and thereby the fluid chamber L is tightly sealed.

As shown in FIG. 1, the piston rod 5 is retained in a state in which it is suspended down from the cap member 13, and the piston rod 5 is connected to the vehicle body side via the cap member 13, the outer tube 1, and the vehicle body-side bracket. The piston rod 5 includes a cylindrical rod main body 5a that is supported by the bush B3, and a cylindrical piston retaining part 5b that retains the piston 6.

The piston 6 that is retained by the piston retaining part 5b is formed in an annular shape. As shown in FIGS. 1 and 2, the piston 6 partitions the operation chamber V on the top side in FIG. 1 of the fluid chamber L into an extension-side chamber V1 and a contraction-side chamber V2. The piston 6 is fixed to the outer periphery of the piston retaining part 5b by a nut 60. Further, an extension-side piston passage 6a and a contraction-side piston passage (only the extension-side piston passage 6a is illustrated, and the contraction-side piston passage is not illustrated), which allow the extension-side chamber V1 to communicate with the contraction-side chamber V2, are formed in the piston 6. An extension-side damping valve 61, which opens/closes the outlet of the extension-side piston passage 6a, is provided on the bottom end in FIG. 2 of the piston 6. The extension-side damping valve 61 permits only the flow of hydraulic fluid moving through the extension-side piston passage 6a from the extension-side chamber V1 to the contraction-side chamber V2, and blocks the flow of hydraulic fluid in the opposite direction. Further, a contraction-side check valve 62, which opens/closes the outlet of the contraction-side piston passage (not illustrated), is provided on the top end in FIG. 2 of the piston 6. The contraction-side check valve 62 permits only the flow of hydraulic fluid moving from the contraction-side chamber V2 to the extension-side chamber V1, and blocks the flow of hydraulic fluid in the opposite direction.

As shown in FIG. 2, a restriction spring S3 is interposed between the piston retaining part 5b and the rod guide 7. The restriction spring S3 restricts the top end of the piston retaining part 5b from forcefully colliding into the rod guide 7 during maximum contraction of the front fork 100.

Although not illustrated, a bypass passage (not illustrated), which bypasses the extension-side piston passage 6a and the contraction-side piston passage to allow the extension-side chamber V1 to communicate with the contraction-side chamber V2, is formed in the piston retaining part 5b. In this bypass passage, for example, a damping valve such as a needle valve is accommodated. By adjusting the flow path surface area of this damping valve, the damping force can be adjusted.

As shown in FIG. 1, a large inner diameter part 4a, which is formed to have a large inner diameter compared to the inner diameter of the other portions, is formed at a lower portion of the cylinder 4. A communication hole 4b that penetrates through the large inner diameter part 4a is formed in the large inner diameter part 4a. The bottomed cylindrical bottom member 21 is mounted onto the bottom end of the cylinder 4 by being screwed onto the outer periphery of the large inner diameter part 4a of the cylinder 4. A small outer diameter part 21a, which is formed to have a small outer diameter compared to the outer diameter of the other portions, is formed in the bottom member 21. Further, a stepped part 21b is provided on the bottom member 21 between the outer peripheral surface of the small outer diameter part 21a and the outer peripheral surface of the other portions.

As shown in FIG. 1, a flange member 22 is provided on the bottom end of the base rod 10. The base rod 10 is fixed to the inside of the cylinder 4 by sandwiching the flange member 22 with the bottom member 21 and the cylinder 4.

The base member 11 is fixed with a nut 30 to the distal end of the base rod 10, and partitions the fluid chamber L into the operation chamber V and the reservoir R. In the base member 11, an extension-side base passage 11a that allows the operation chamber V to communicate with the reservoir R and a contraction-side base passage (only the extension-side base passage 11a is illustrated, and the contraction-side base passage is not illustrated) are formed. Further, an extension-side check valve 31 that opens/closes the outlet of the extension-side base passage 11a is provided on the top end in FIG. 1 of the base member 11. The extension-side check valve 31 permits only the flow of hydraulic fluid moving through the extension-side base passage 11a from the reservoir R to the operation chamber V, and blocks the flow of hydraulic fluid in the opposite direction. In addition, a contraction-side damping valve 32 that opens/closes the outlet of the contraction-side base passage (not illustrated) is provided on the bottom end in FIG. 1 of the base member 11. The contraction-side damping valve 32 permits only the flow of hydraulic fluid moving from the operation chamber V to the reservoir R, and blocks the flow of hydraulic fluid in the opposite direction.

The free piston 12 is formed in an annular shape, and moves in the axial direction through the inside of the cylinder 4 while slidingly contacting the outer peripheral surface of the base rod 10 and the inner peripheral surface of the cylinder 4. The free piston 12 partitions the reservoir R into a compensation chamber R1 and a back surface chamber R2.

The biasing spring S1 which biases the free piston 12 toward the top side in FIG. 1 (toward the base member 11 side) is accommodated in the back surface chamber R2 and is interposed in a compressed state between the bottom member 21 and the free piston 12. The biasing spring S1 pressurizes the operation chamber V and the compensation chamber R1 via the free piston 12, and thereby the improves the responsiveness of damping force generation of the front fork 100.

In the case that the hydraulic fluid within the fluid chamber L thermally expands or the like causing the pressure within the fluid chamber L to become excessive, if the free piston 12 retreats back to the large inner diameter part 4a of the cylinder 4, a gap is formed between the free piston 12 and the cylinder 4, and pressure is released to the fluid reservoir P via the communication hole 4b.

In the following, it will be briefly explained how a damping force is exerted during extension and contraction of the damper cartridge D. During extension of the front fork 100, in which the piston rod 5 of the damper cartridge D moves out of the cylinder 4, hydraulic fluid of the extension-side chamber V1 that is pressurized by the piston 6 passes through the extension-side piston passage 6a and the bypass passage (not assigned a reference numeral) and moves into the contraction-side chamber V2. Further, hydraulic fluid in an amount equivalent to the volume of the piston rod that has moved out of the cylinder 4 passes through the extension-side base passage 11a and moves from the compensation chamber R1 to the contraction-side chamber V2. At this time, the front fork 100 exerts an extension-side damping force caused by the resistance of the extension-side damping valve 61 and the damping valve provided in the bypass passage.

Conversely, during contraction of the front fork 100, in which the piston rod 5 of the damper cartridge D moves into the cylinder 4, hydraulic fluid of the contraction-side chamber V2 that is pressurized by the piston 6 passes through the contraction-side piston passage (not illustrated) and the bypass passage (not assigned a reference numeral) and moves into the extension-side chamber V1. Further, hydraulic fluid in an amount equivalent to the volume of the piston rod that has moved into of the cylinder 4 passes through the contraction-side base passage (not illustrated) and moves from the contraction-side chamber V2 to the compensation chamber R1. At this time, the front fork 100 exerts a contraction-side damping force caused by the resistance of the damping valve provided in the bypass passage (not assigned a reference numeral) and the contraction-side damping valve 32.

The damping cartridge D which includes the above-described parts is assembled in advance and then accommodated in the fork main body 3. Therefore, the assembly of the front fork 100 can be simplified, and failure to attach certain parts can be prevented.

The method for accommodating the damper cartridge D will now be explained concretely. The vehicle wheel-side bracket 20 includes a connecting part 20a that is connected to the axle, and a cylindrical part 20b that rises up from the connecting part 20a. When the bottom member 21 of the damper cartridge D is inserted into the cylindrical part 20b, the bottom member 21 is positioned by a stepped surface 20c that is formed on the inner periphery of the cylindrical part 20b. In this state, when the inner tube 2 is screwed into the inner periphery of the cylindrical part 20b, the stepped part 21b of the bottom member 21 is sandwiched between the inner tube 2 and the stepped surface 20c, and thereby the bottom member 21 is fixed to the vehicle wheel-side bracket 20.

Next, the method for filling the hydraulic fluid during assembly of the front fork 100 will be explained. In a state in which the damper cartridge D is accommodated in the fork main body 3 and the cap member 13 and the main spring S2 are not yet mounted, the hydraulic fluid is poured from the vehicle-body side opening of the fork main body 3. Since the fluid filling port 7a which allows the inside of the cylinder 4 to communicate with the outside of the cylinder 4 is provided to the rod guide 7 which partitions the fluid reservoir P and the fluid chamber L within the damper cartridge D, the hydraulic fluid is filled into the fluid chamber L via the fluid filling port 7a.

After filling the hydraulic fluid, the annular closing member 8 is provided onto the rod guide 7, and the closing member 8 is configured from above as a spring seat and the main spring S2 is mounted thereon together with the cap member 13.

In this way, according to the front fork 100, even if the cylinder 4 is set to an upright configuration, the hydraulic fluid can be easily filled into the cylinder 4 after the cylinder 4 is attached to the fork main body 3.

The inner diameter of the closing member 8 is set to be larger than the outer diameter of the piston rod 5. Further, the outer diameter of the closing member 8 is set to be smaller than the inner diameter of the inner tube 2. Since there is a gap between the inner diameter of the closing member 8 and the outer diameter of the piston rod 5, the closing member 8 can move in the radial direction. The distance between the inner peripheral end of the closing member 8 and the opening end of the fluid filling port 7a is set to be bigger than the difference between the outer diameter of the closing member 8 and the inner diameter of the inner tube 2. Therefore, even if the closing member 8 moves in the radial direction, it will abut the inner periphery of the inner tube 2, and thereby the movement in the radial direction is restricted. Therefore, the fluid filling port 7a can be surely closed.

As shown in FIG. 2, the difference between the outer diameter of the closing member 8 and the inner diameter of the inner tube 2 is smaller than the difference between the inner diameter of the closing member 8 and the outer diameter of the piston rod 5. Therefore, the closing member 8 is positioned on the inner tube 2 side, and thus even if the closing member 8 moves in the radial direction, it does not interfere with the piston rod 5 and there is no risk of damaging the piston rod 5.

In the front fork 100, the cylinder 4 is fixed to the inner tube 2 side of the fork main body 3, and the closing member 8 is disposed within the inner tube 2. Thereby, during extension/contraction of the front fork 100, the cylinder 4 and the inner tube 2 do not move relative to each other, and thus there is no risk that the closing member 8, which is provided on the rod guide 7 mounted to the cylinder 4, will damage the inner tube 2 even if the closing member 8 interferes with the inner tube 2.

The closing member 8 is strongly pressed by the main spring S2 so as to fit closely to the rod guide 7, and thereby the fluid filling port 7a is tightly sealed.

As described above, the front fork 100 includes the main spring S2 that is interposed between the fork main body 3 and the rod guide 7 within the fork main body 3, and the main spring S2 presses the closing member 8. Due to this configuration, the main spring S2 biases the fork main body 3 in the extension direction, and thereby the vehicle body can be elastically supported. Further, the closing member 8 can be prevented from coming out due to the pressing of the closing member 8 by the main spring S2.

Since the closing member 8 closes the fluid filling port 7a of the rod guide 7, leaks of hydraulic fluid from within the cylinder 4 through the fluid filling port 7a can be prevented during operation of the front fork 100.

Since the closing member 8 also serves as a spring seat of the main spring S2, it is not necessary to provide a separate spring seat, and thus the number of parts can be reduced and the time/effort required for assembly can be reduced.

In the front fork 100, since the closing member 8 is pressed and fixed by the main spring S2, there is no need for a member used solely to fix the closing member 8.

In the front fork 100, after filling the hydraulic fluid, it is not necessary to put a separate fixing tool into the front fork 100. Therefore, a situation in which hydraulic fluid adheres to the fixing tool and is carried to the outside when putting in/removing the fixing tool does not occur, and the fluid amount within the front fork 100 does not vary after the fluid filling operation.

According to the above-described constitution, when replacing the hydraulic fluid within the front fork 100 or the like, the closing member 8 can also be easily removed by simply removing the main spring 2. Therefore, the hydraulic fluid can be easily replaced.

A larger opening surface area of the fluid filling port 7a allows for easier filling of the hydraulic fluid. However, if the opening surface area of the fluid filling part 7a is increased, the force that separates the closing member 8 from the rod guide 7 due to the action of the pressure of the extension-side chamber V1 increases. Therefore, the opening surface area of the fluid filling port 7a should be determined so that the force received by the closing member 8 does not exceed the spring force of the main spring S2 when the pressure of the extension-side chamber V1 of the damper cartridge D reaches a practical maximum.

If it is difficult to stop the closing member 8 from separating from the rod guide 7 with the main spring S2, a throttle can be provided in the fluid filling port 7a so as to decreases the pressure acting on the closing member 8 and stop the above-mentioned separation. Alternatively, after filling the hydraulic fluid, a plug equipped with an orifice can be mounted to the fluid filling port 7a so as to decrease the pressure acting on the closing member 8. Thereby, the closing member 8 can be firmly fixed to the rod guide 7 without increasing the spring force of the main spring S2.

In the present embodiment, the closing member 8 is fixed to the rod guide 7 by the main spring S2. However, the attachment method is not limited thereto. For example, an air spring can be used instead of the main spring S2. If an air spring is used, a separate fixing tool should be provided to fix the closing member 8, or an annular projection should be provided on the bottom surface of the closing member 8 so as to fix the closing member 8 to the rod guide 7 by fitting the projection into the fluid filling port 7a of the rod guide 7. Alternatively, the fluid filling port 7a can be closed by using the closing member as a bolt and screw fastening the closing member into the fluid filling port 7a.

Embodiments of this invention were described above, but the above embodiments are merely examples of applications of this invention, and the technical scope of this invention is not limited to the specific constitutions of the above embodiments.

This application claims priority based on Japanese Patent Application No. 2015-75531 filed with the Japan Patent Office on Apr. 2, 2015, the entire contents of which are incorporated into this specification.

The invention claimed is:

1. A front fork comprising:
   a fork main body having an annular outer tube and an annular inner tube that is inserted into the outer tube such that the inner tube can freely move in an axial direction of the inner tube;

a damper cartridge having:
- a cylinder which is provided in the fork main body and in which a fluid chamber filled with hydraulic fluid is formed;
- a piston rod that freely moves in the axial direction through the inside of the cylinder;
- a piston that is mounted on the piston rod and partitions the inside of the cylinder into an extension-side chamber and a contraction-side chamber; and
- a rod guide which is mounted on an end of the cylinder and guides the piston rod, the rod guide including a fluid filling port through which the hydraulic fluid passes between an outside of the cylinder and the fluid chamber; and a closing member that is provided on the rod guide and maintains the fluid filling port in a closed position while the front fork is in operation so that the hydraulic fluid is not allowed to pass the fluid filling port.

2. The front fork according to claim 1, further comprising a main spring that is interposed between the fork main body and the rod guide within the fork main body, wherein the main spring is configured to press the closing member.

3. The front fork according to claim 2, wherein the closing member serves as a spring seat of the main spring.

4. The front fork according to claim 1, wherein the cylinder is fixed to the inner tube side of the fork main body, and the closing member is disposed within the inner tube.

5. The front fork according to claim 4, wherein the closing member is annular, and the difference between the outer diameter of the closing member and the inner diameter of the inner tube is smaller than the difference between the inner diameter of the closing member and the outer diameter of the piston rod.

* * * * *